United States Patent

Kiehn et al.

[11] Patent Number: 5,470,504
[45] Date of Patent: Nov. 28, 1995

[54] SILOXANE POLYMER COMPOSITIONS

[75] Inventors: Arthur J. Kiehn; Mark H. Eskridge, both of Seattle, Wash.

[73] Assignee: Bardahl Manufacturing Corporation, Seattle, Wash.

[21] Appl. No.: 181,750

[22] Filed: Jan. 21, 1994

[51] Int. Cl.$^6$ .................. C10M 127/02; C10M 155/02
[52] U.S. Cl. ............... 252/49.6; 252/52 R; 252/56 R
[58] Field of Search ................................ 252/49.6

[56] References Cited

U.S. PATENT DOCUMENTS

| | | | |
|---|---|---|---|
| 2,523,281 | 9/1950 | Currie | 106/3 |
| 2,681,859 | 6/1954 | Wenaas | 106/10 |
| 2,856,297 | 10/1958 | Geen | 106/3 |
| 2,955,047 | 10/1960 | Terry | 106/3 |
| 3,110,601 | 11/1963 | Emblem | 106/55 |
| 3,175,921 | 3/1965 | Hedlund | 117/175 |
| 3,342,740 | 9/1967 | Kazmierczak et al. | 252/153 |
| 3,360,472 | 12/1967 | Renold | 252/170 |
| 3,460,981 | 8/1969 | Kell et al. | 117/135.1 |
| 3,494,951 | 2/1970 | Berger | 260/448.2 |
| 3,529,007 | 9/1970 | Brison et al. | 260/448.8 |
| 3,576,779 | 4/1971 | Holdstock et al. | 260/29.2 |
| 3,639,131 | 2/1972 | Clarke | 106/2 |
| 3,687,642 | 8/1972 | Koerner et al. | 423/342 |
| 3,766,123 | 10/1973 | Burnie et al. | 260/32.4 |
| 3,772,065 | 11/1973 | Seiler | 117/123 C |
| 3,817,889 | 6/1974 | Fink et al. | 260/28 |
| 3,879,206 | 4/1975 | Nestler et al. | 106/12 |
| 3,933,511 | 1/1976 | Heintzelman et al. | 106/10 |
| 4,013,475 | 3/1977 | Liebowitz et al. | 106/10 |
| 4,247,330 | 1/1981 | Sanders, Jr. | 106/3 |
| 4,354,871 | 10/1982 | Sutton | 106/3 |
| 4,374,745 | 2/1983 | Sibley et al. | 252/106 |
| 4,398,953 | 8/1983 | van der Linde | 106/10 |
| 4,434,190 | 2/1984 | Dubois et al. | 427/136 |
| 4,525,213 | 6/1985 | Linn | 106/2 |
| 4,544,377 | 10/1985 | Schwen | 51/298 |
| 4,553,982 | 11/1985 | Korbel et al. | 51/298 |
| 4,614,612 | 9/1986 | Reilly et al. | 252/541 |
| 4,615,738 | 10/1986 | Sanders, Jr. et al. | 106/13 |
| 4,683,001 | 7/1987 | Floyd et al. | 106/3 |
| 4,837,261 | 6/1989 | Hampe et al. | 524/268 |
| 4,859,359 | 8/1989 | DeMatteo et al. | 252/174.15 |
| 4,874,431 | 10/1989 | Fey et al. | 106/2 |
| 4,936,914 | 6/1990 | Hurley et al. | 106/3 |
| 4,953,360 | 9/1990 | Rzechula | 62/66 |
| 5,043,012 | 8/1991 | Shinohara et al. | 106/10 |
| 5,061,606 | 10/1991 | Telser et al. | 430/306 |
| 5,085,695 | 2/1992 | Randen et al. | 106/8 |
| 5,112,358 | 5/1992 | Deal, III | 8/137 |
| 5,128,431 | 7/1992 | Riding et al. | 528/15 |
| 5,134,021 | 7/1992 | Hosono et al. | 428/213 |
| 5,182,105 | 1/1993 | Takata et al. | 424/78 |

*Primary Examiner*—Ellen M. McAvoy
*Attorney, Agent, or Firm*—Seed and Berry

[57] ABSTRACT

There is disclosed a composition containing a siloxane polymer for cleaning, polishing and lubricating surfaces. In addition to the siloxane polymer, the composition further contains a surface bonding enhancer, a lower alkyl alcohol, and a citrus extract. In further embodiments, the siloxane polymer composition may also contain a corrosion inhibitor and/or an anti-wearing agent. The siloxane polymer of this invention is a low viscosity siloxane polymer or a mixture of a low and high viscosity siloxane polymer. In a preferred embodiment, the citrus extract is d-limonene.

25 Claims, No Drawings

5,470,504

SILOXANE POLYMER COMPOSITIONS

TECHNICAL FIELD

The present invention relates generally to siloxane polymer compositions and, more specifically, to siloxane polymer compositions for cleaning, polishing, and lubricating surfaces.

BACKGROUND OF THE INVENTION

Cleaning and polishing compositions containing wax are well known, and have commonly been employed on the surface of automobiles and other products. Because such compositions usually require substantial physical effort to apply and finish, research has focused on alternative, more readily applied compositions.

One area of research has focused on emulsion-type compositions. For example, various emulsion-type polishes have been developed which provide advantageous properties, such as water beading, applicability to nonmetal surfaces, ease of application, cleaning effect, removal of oxidized paint, and lubricative properties. Emulsion-type polishes can also provide some protection to the surfaces to which they are applied. Unfortunately, attempts to improve the effectiveness of any one of the above properties has typically resulted in a corresponding reduction in effectiveness in another property.

An example of a known emulsion-type polishing composition employs organopolysiloxanes in optional combination with a wax (see, e.g., U.S. Pat. No. 4,398,953). Such organopolysiloxane-based compositions have been used due to their ease of application to the surface to be treated, and uniform appearance after buffing. It is generally recognized that these compositions neither provide a long lasting finish nor are generally effective in removing unwanted deposits (such as corrosion, "road tar" and oxidized paint) from a painted surface. To improve the cleaning properties of such compositions, emulsion-type polishes typically incorporate abrasive materials to affect removal of such deposits from a surface to be cleaned. While the abrasive materials effectively remove surface deposits by a scouring action, surface damage may result. Furthermore, because emulsion-type polishing compositions usually contain water, rapid dispersion and fast "drying" of the compositions are not possible.

A further disadvantage to existing cleaning and polishing compositions is that they often contain chlorinated and fluorinated solvents which are environmentally unfavorable. For example, U.S. Pat. No. 2,856,297 describes a wax-free, water-free polish containing silicone polymers and chlorinated and fluorinated solvents. These solvents have the further disadvantage of volatility—that is, they evaporate too quickly to have any appreciable cleaning properties.

Accordingly, there is a need in the art for an effective, water-free polishing composition that does not contain environmentally damaging solvents, can be made wax-free, and has cleaning and anti-corrosive properties. The present invention fulfills these needs, and provides further related advantages.

SUMMARY OF THE INVENTION

In general, the present invention discloses siloxane polymer compositions useful in cleaning, polishing and lubricating surfaces. In one embodiment, the composition of the present invention includes a low viscosity siloxane polymer to provide a durable protective surface finish, a surface bonding enhancer to enhance adhesion of the composition to the applied surface and thereby increase finish lifetime, and a lower alkyl alcohol and a citrus extract to effect rapid dispersion of the composition and fast "drying" on the surface.

In another embodiment, the siloxane polymer composition further comprises a high viscosity siloxane polymer. In this embodiment, the compositions are effective as polishing compositions, and provide improved properties relating to water beading, ease of application and finish lifetimes.

In still a further embodiment, the siloxane polymer composition further comprises a corrosion inhibitor. The corrosion inhibitor is effective in preventing corrosion on metal surfaces to which the siloxane polymer composition is applied.

In yet another embodiment, the composition of the present invention further comprises an anti-wearing agent. The addition of the anti-wearing agent provides a siloxane polymer composition which is particularly effective as a lubricant.

Other aspects of this invention will become apparent upon reference to the following detailed description and appended claims.

DETAILED DESCRIPTION OF THE INVENTION

The present invention is directed to a composition containing a siloxane polymer for cleaning, polishing, and/or lubricating surfaces. In one embodiment, the composition comprises a low viscosity siloxane polymer, a surface bonding enhancer, a lower alkyl alcohol, and a citrus extract. The low viscosity siloxane polymer imparts dispersability, high gloss, and water repellent properties to the composition. The surface bonding enhancer provides improved surface adhesion of the composition and renders it useful as a durable and corrosion resistant polish. The lower alkyl alcohol and citrus extract are carriers which effect rapid, easy, and uniform application of the composition to a surface. In another embodiment, the composition further comprises a high viscosity siloxane polymer. The high viscosity siloxane polymer is useful in providing a tough, resilient, and durable polish finish.

As used herein, the term "siloxane polymer" refers to any one of a family of organosilicon oxide polymers (organopolysiloxanes) in which the repeating structural unit is —($R_2$Si—O)—, where R is a monovalent organic radical (for example, methyl or phenyl), and the terminating groups are trimethylsiloxy groups, —Si($CH_3$)$_3$. The siloxane polymer may be branched or linear. Preferably the siloxane polymer is a linear polydialkylsiloxane and, in a most preferred embodiment, the siloxane polymer is polydimethylsiloxane. Such siloxane polymers may be represented by the following formula:

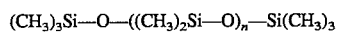

$(CH_3)_3Si—O—((CH_3)_2Si—O)_n—Si(CH_3)_3$ where n is an integer greater than 20.

Depending upon the number of repeating structural units of the polymer, n, the siloxane polymer may be either a low or high viscosity siloxane polymer. As used herein, a "low viscosity siloxane polymer" refers to a siloxane polymer with a viscosity which ranges from 50 to 1000 centistokes, and a "high viscosity siloxane polymer" refers to a siloxane polymer with a viscosity which ranges from 5,000 to 2,500,000 centistokes. Low viscosity siloxane polymers contain between about 40 and 400 repeating structural units, and high viscosity siloxane polymers contain between about 500 and 50,000 repeating structural units. In a preferred embodiment, the low viscosity siloxane polymer has a viscosity which ranges from 200 to 500 centistokes. In a most preferred embodiment, the low viscosity siloxane polymer has a viscosity of about 350 centistokes. In a preferred embodiment, the high viscosity siloxane polymer has a viscosity which ranges from 5,000 to 50,000 centistokes. In a most preferred embodiment, the high viscosity siloxane polymer has a viscosity of about 10,000 centistokes.

Suitable siloxane polymers of the present invention are commercially available. For example, suitable low viscosity siloxane polymers include (but are not limited to) Dow Corning 200 350 cSt (Dow Corning Corporation, Midland, Mich.), GE SF96-350 (General Electric Company, Waterford, N.Y.), MASIL SF 350 cSt (PPG Corp., Gumee, Ill.) and PS041.5 (Petrarch Systems, Bristol, Pa.). Suitable high viscosity siloxane polymers include (but are not limited to) GE Viscasil 10,000 cSt (General Electric Company, Waterford, N.Y.), and PS045 (Petrarch Systems, Bristol, Pa.).

The high and low viscosity siloxane polymers may each be present in the composition in an amount ranging from 0.1% to 40% by volume. In a preferred embodiment, the low viscosity siloxane polymer is present in an amount ranging from 2% to 20% by volume, and in a more preferred embodiment in an amount ranging from 4% to 6% by volume. In a preferred embodiment, the high viscosity siloxane polymer is present in an amount ranging from 0.5% to 10% by volume and, in a more preferred embodiment, in an amount ranging from 0.5% to 2% by volume.

The compositions of the present invention also include a surface bonding enhancer which improves the adhesion of the composition to a surface, and thereby increasing the lifetime of the finish. The surface bonding enhancer may be a diester fluid and/or a hydrophilic siloxane polymer. The surface bonding enhancer may be present in the composition in an amount ranging from 0.1% to 15% by volume. In a preferred embodiment, the surface bonding enhancer is present at about 0.2% by volume.

As used herein, "diester fluid" refers to a high molecular weight diester, and may be represented by the following formula:

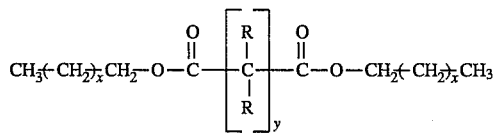

where x is an integer from 5 to 15, y is an integer from 2 to 10, and R is either hydrogen, or when y is 2, R is either hydrogen or when taken together represent the remaining portion of a 1,2-benzo group. A diester may be prepared by the condensation of two molar equivalents of an alcohol with a dicarboxylic acid. Suitable diester fluids may be prepared from a variety of alcohols and dicarboxylic acids. Suitable alcohols include those represented by the formula. $CH_3$—$(CH_2)_x$—$OH$, where x is an integer from 5 to 15. Suitable dicarboxylic acids include phthalic acid and those represented by the formula $HO_2C$—$(CH_2)_y$—$CO_2H$, where y is an integer from 2 to 10. Preferred diester fluids are adipate (y=4), azelate (y=7), sebacate (y=8), and phthalate esters derived from alcohols with x ranging from 8 to 13. Suitable diester fluids may have viscosities which range from about 5 to about 50 centistokes. In a preferred embodiment, the diester fluid is a 30 centistoke diester fluid (Vistone A-30, Exxon Chemical Co., Houston, Tex.).

Alternatively, the surface bonding enhancer may be a hydrophilic siloxane polymer. As used herein, "hydrophilic siloxane polymer" refers to a siloxane polymer as described above, except that the hydrophilic siloxane polymer terminates with hydrophilic groups rather than with hydrophobic trimethylsiloxy groups. Hydrophilic groups are chemical moieties which contain polar functional groups. Suitable polar functional groups include (but are not limited to) amines, alcohols, ethers, and carbonyl derivatives (such as ketones, aldehydes, carboxylic acids, esters, and amides). Preferred polar groups include amines, esters, and ethers. In a preferred embodiment, the hydrophilic siloxane polymer is an amine functional silicone fluid. Suitable amine functional silicone fluids are commercially available and include (but are not limited to) Dow Corning 536 (Dow Corning Corp., Midland, Mich.), GE SF 1706 (General Electric Co., Waterford, N.Y.), and PS510 (Petrarch Systems, Bristol, Pa.).

The siloxane polymer compositions of the present invention also include a lower alkyl alcohol and a citrus extract as volatile carriers of the siloxane polymers. Such carriers solubilize the siloxane polymers of the composition, and further assist in their rapid and uniform dispersion upon the surface to be cleaned, polished, or lubricated. The volatile nature of the carriers ensures that once the composition has been applied to the surface, rapid "drying" results. Thus, evaporation of the lower alkyl alcohol and citric extract provides the finish comprising the siloxane polymers. Suitable carriers include organic compounds which evaporate sufficiently rapid to yield a polished surface within 1 to 2 minutes following application of the composition, yet do not evaporate so rapidly as to prevent complete surface dispersion of the siloxane polymers.

Suitable lower alkyl alcohols include alcohols containing between 2 and 6 carbons. Preferred lower alkyl alcohols include ethanol, propanols, and butanols. In a more preferred embodiment, the lower alkyl alcohol is a mixture of ethanol and isopropanol. In a further preferred embodiment, the lower alkyl alcohol is isopropanol. The lower alkyl alcohol may be present in the composition in an amount ranging from 5% to 80% by volume. In a preferred embodiment, the lower alkyl alcohol is present in an amount ranging from 60% to 75% by volume.

As indicated above, the siloxane polymer compositions also include a citrus extract as a volatile carrier of the siloxane polymers. Suitable citrus extracts include extracted oils of citrus fruits such as lemons, oranges, and mandarins. Preferred citrus extracts include ethereal extracts. In a most preferred embodiment, the citrus extract is a d-limonene extract. Suitable grades of d-limonene containing citrus extracts are commercially available. For example, suitable grades include technical grade lemon-lime (70% d-limonene), food grade d-limonene (90% to 96% d-limonene) (Florida Chemical Company, Lake Alfred, Fla. and d-limonene (GLIDCO Organics, Jacksonville, Fla.)). The citrus extract may be present in the composition in an amount ranging from 20% to 50% by volume. In a preferred embodiment, the citrus extract is present in an amount between 25% and 35% by volume.

A preferred embodiment of the present invention, a composition particularly useful for polishing and cleaning, may be formulated by combining the following components:

| Component | Volume Percent |
| --- | --- |
| Low viscosity siloxane polymer: (Dow Corning 200 350 cSt) | 6.0 |
| Surface bonding enhancer: (Vistone A-30) | 0.2 |
| Lower alkyl alcohol: (Isopropanol) | 65.0 |
| Citrus extract: (d-limonene) | 28.8 |

In a further embodiment, the siloxane polymer composition comprises a low viscosity siloxane polymer, a surface bonding enhancer, a lower alkyl alcohol, a citrus extract, and a corrosion inhibitor. The corrosion inhibitor is effective in preventing corrosion in metal surfaces to which the siloxane polymer based composition is applied. This composition may also be useful as a general purpose lubricant.

Suitable corrosion inhibitors are commercially available and include oil soluble and oil/water soluble corrosion inhibitors. Suitable oil soluble corrosion inhibitors may be based on petrolatum, a blend of mineral oil with waxes crystallized from the residual type of petroleum lubricating oil. The waxes of petrolatum typically contain from 30 to 70 carbon atoms and are straight chains. Oil/water soluble corrosion inhibitors include metal sulfonates such as calcium or sodium sulfonates. In a preferred embodiment the corrosion inhibitor is an oil soluble corrosion inhibitor such as Mazon 202-108 or Mazon RI 6 (PPG Mazer Chemicals, Gurnee, Ill.). The corrosion inhibitor may be present in the composition in an amount ranging from 3% to 20% by volume. In a preferred embodiment, the corrosion inhibitor is present in an amount ranging from 3% to 8% by volume.

A preferred embodiment of the present invention, particularly useful as a general purpose lubricating composition, may be formulated by combining the following components:

| Component | Volume Percent |
| --- | --- |
| Low viscosity siloxane polymer: (Dow Corning 200 350 cSt) | 6.0 |
| Surface bonding enhancer: (Vistone A-30) | 6.0 |
| Lower alkyl alcohol: (Isopropanol) | 41.0 |
| Citrus extract: (d-limonene) | 40.0 |
| Corrosion inhibitor (Mazon 202-108) | 7.0 |

In yet another embodiment, the siloxane polymer composition of the present invention comprises an anti-wearing agent. The addition of the anti-wearing agent provides a siloxane polymer composition which is particularly effective as a chain lubricant. Suitable anti-wearing agents include extreme pressure (EP) anti-wearing agents. EP agents are compounds which are capable of lubricating surfaces under conditions of high temperature and/or high pressure where a normal hydrocarbon oil film would be forced away from the wear surface. The enhanced performance of EP agents results from their ability to adhere to the wear surface, thus providing a sacrificial lubricating layer. The molecular layer of lubricant is formed either through reaction with the wear surface or through formation of polar interactions between the surface and the EP agent. For example, Vistone A-30, a diester, acts as a mild EP agent which adheres to wear surfaces through a polar interaction, while Amoco 158/Hitec 4313 (Ethyl Corp., Richmond, Va.) or Vanlube 871 (R. T. Vanderbilt Co., Norwalk, Conn.), react with wear surfaces to form a lubricating layer. Amoco 158 and Vanlube 871 are dimercaptothiadiazole derivatives and belong to a family of anti-wearing agents known as sulfur type EP agents. A further example of a thiadiazole EP agent includes Additin RC 8210 (Rhein Chemie Corp., Trenton, N.J.).

Alternatively, the anti-wearing EP agents may be sulfur-phosphorous compounds in which the ratio of sulfur to phosphorous is between 10 to 1 and 1 to 30. Examples of such suitable anti-wearing agents include Anglamol 6004 or 6043 (The Lubuizol Corp., Wickliffe, Ohio), Elco 7 (Elco Corp., Millington, N.J.), and Vanlube 804-S (R. T. Vanderbilt Co., Norwalk, Conn.).

In a preferred embodiment, the anti-wearing agent is a sulfur type EP agent such as Amoco 158, Vanlube 871 or Additin RC 8210. The anti-wearing agent may be present in the composition in an amount ranging from 4% to 20% by volume. In a preferred embodiment, the anti-wearing agent is present in an amount ranging from 8% to 12% by volume.

A preferred embodiment of the present invention, particularly useful as an extreme pressure chain lubricating composition, may be formulated by combining the following components:

| Component | Volume Percent |
| --- | --- |
| Low viscosity siloxane polymer: (Dow Corning 200 350 cSt) | 6.0 |
| Surface bonding enhancer: (Vistone A-30) | 13.0 |
| Lower alkyl alcohol: (Isopropanol) | 20.0 |
| Citrus extract: (d-limonene) | 40.0 |
| Corrosion inhibitor: (Mazon 202-108) | 11.0 |
| Anti-wearing agent: (Amoco 158) | 10.0 |

Embodiments of the present invention which incorporate anti-wearing agents may optionally contain an odor mask. Suitable odor masks include vanilla odor masks such as Vanilla Fragrance Mask 41699 (Stanley Schoenmann, Inc., Clark, N.J.) and Chemask (ChemCentral Corp., Chicago, Ill.). These odor masks have been determined to mask the sulfur odor of the anti-wearing agent containing compositions of the present invention when the odor mask is present in the composition at a concentration as low as 0.07% by volume.

The following examples are offered by way of illustration, not limitation.

EXAMPLES

Example 1

This example illustrates the formulation of a siloxane polymer composition of the present invention. The effectiveness of this composition, formula A, as an automotive polish relative to a control polish is presented in Example 3, Table 1. Specifically, a composition comprising the following components was prepared:

| Formula A | Volume Percent |
|---|---|
| Low viscosity siloxane polymer: (Dow Corning 200 350 cSt) | 6.0 |
| Surface bonding enhancer: Diester fluid (Vistone A-30, Exxon Chemical Co., Houston, TX) | 2.0 |
| Lower alkyl alcohol: Isopropanol (Shell Oil Co., Houston, TX) | 65.0 |
| Citrus extract: d-limonene (Florida Chemical Co., Lake Alfred, FL) | 27.0 |

Example 2

This example illustrates the formulation of siloxane polymer compositions of the present invention which further include a high viscosity siloxane polymer component. In these formulations the surface bonding enhancer is either an amine functional silicone fluid or a diester fluid. The effectiveness of these compositions (i.e., Formulas B, C and D), as automotive polishes relative to a control polish is presented in Example 3, Table 1.

A. Amine functional silicone fluid as surface bonding enhancer.

| Formula B | Volume Percent |
|---|---|
| High viscosity siloxane polymer: (Dow Corning 200 10,000 cSt) | 2.0 |
| Low viscosity siloxane polymer: (Dow Corning 200 350 cSt) | 4.0 |
| Surface bonding enhancer: Amine functional silicone fluid (Dow Corning 536) | 2.0 |
| Lower alkyl alcohol: Isopropanol (Shell Oil Co., Houston, TX) | 62.0 |
| Citrus extract: d-limonene (Florida Chemical Co., Lake Alfred, FL) | 30.0 |

B. Diester fluid as surface bonding enhancer.

| Formula C | Volume Percent |
|---|---|
| High viscosity siloxane polymer: (Dow Corning 200 10,000 cSt) | 2.0 |
| Low viscosity siloxane polymer: (Dow Corning 200 350 cSt) | 4.0 |
| Surface bonding enhancer: Diester fluid (Vistone A-30, Exxon Chemical Co., Houston, TX) | 2.0 |
| Lower alkyl alcohol: Isopropanol (Shell Oil Co., Houston, TX) | 65.0 |
| Citrus extract: d-limonene (Florida Chemical Co., Lake Alfred, FL) | 27.0 |

| Formula D | |
|---|---|
| High viscosity siloxane polymer: (Dow Corning 200 10,000 cSt) | 0.5 |
| Low viscosity siloxane polymer: (Dow Corning 200 350 cSt) | 5.5 |
| Surface bonding enhancer: Diester fluid (Vistone A-30, Exxon Chemical Co., Houston, TX) | 2.0 |
| Lower alkyl alcohol: Isopropanol (Shell Oil Co., Houston, TX) | 65.0 |
| Citrus extract: d-limonene (Florida Chemical Co., Lake Alfred, FL) | 27.0 |

Example 3

This example presents the results of testing the polishing compositions of the present invention according to ASTM D-3836, a standard procedure for evaluation of automotive polish. Specifically, Table 1 below summarizes the test results for the compositions of the present invention (i.e., Formulas A, B, C and D), and compares them to the results obtained for a commercially available polish (i.e., "Paint Shield," Filpak Corp., Hallandale, Fla.) used as a control.

TABLE 1

Polish Test (ASTM D-3836)

| Property | Control | Polish/Formula | | | |
|---|---|---|---|---|---|
| | | A | B | C | D |
| Ease of Application | 3.0 | 4.0 | 4.0 | 4.0 | 4.0 |
| Cleaning | 3.0 | 3.0 | 3.0 | 3.0 | 3.0 |
| Gloss | 3.0 | 3.3 | 3.3 | 3.3 | 3.3 |
| Distinctness of Image | 3.0 | 3.1 | 3.0 | 3.0 | 3.0 |
| Beading | 3.0 | 4.0 | 4.1 | 4.0 | 4.0 |

In Table 1 above, the control polish is normalized to a "3" rating. The tested compositions of this invention were then rated by their performance relative to the control polish according to the following scale: 1=worse than control, 3=equal to control, and 5=better than control. The results of the experiment show that all of the polishing compositions of the present invention markedly surpass the control polish in both ease of application and water beading properties. Additionally, Formulas A, B, C and D had improved gloss compared to the control polish, and Formula A exhibited slightly improved distinctness of image.

Example 4

This example illustrates the formulation of a siloxane polymer composition of the present invention, Formula E, and compares its effectiveness as an automotive polish against commercially available products, F, G, and H.

Specifically, Formula E containing the following ingredients was prepared:

| Formula E | Volume Percent |
|---|---|
| High viscosity siloxane polymer: Dow Corning 200 10,000 cSt | 2.0 |
| Low viscosity siloxane polymer: Dow Corning 200 350 cSt | 4.0 |
| Surface bonding enhancer: Amine functional silicone fluid | 4.0 |
| Lower alkyl alcohol: | 65.0 |

-continued

| Formula E | Volume Percent |
| --- | --- |
| Isopropanol | |
| Citrus extract: | 25.0 |
| d-limonene | |

The above composition and commercially available polishes were tested using ASTM D-3836 (standard practice for evaluation of automotive polish) and the results compared to a control polish. The results are presented in Table 2 below. In this table, the control polish is normalized to a "3" rating (rating key: 1=worse than control, 3=equal to control, 5=better than control).

TABLE 2

Polish Test (ASTM D-3836)

| | | Polish/Formula | | | |
| --- | --- | --- | --- | --- | --- |
| Property | Control | E | F | G | H |
| Ease of Application | 3.0 | 4.2 | 4.0 | 3.0 | 2.8 |
| Water Beading | 3.0 | 3.9 | 3.5 | 2.3 | 2.3 |

Polish Formula Identification:
Control — "Paint Shield," Filpak Corp., Hallandale, FL.
E — "Formula E" disclosed above.
F — "Nu Finish," Reed Union Corp., Chicago, IL.
G — "Color Match," Holt Lloyd, United Kingdom.
H — "Kolor Key Wax," Kolor Key Corp., El Paso., TX As summarized in Table 2. Formula E has improved ease of application and water beading properties relative to the control and commercially available polishes.

Example 5

This example presents the results of age testing a polishing composition of the present invention, Formula E, and compares its properties to the commercially available polishes identified in Example 4 above. In particular, the aging test was performed by applying the polishes to a surface (hood and roof of an automobile), exposing the surface to the environment tier two weeks, washing the surface and repeating the water beading, gloss, and image characteristic tests. The results of the aging tests are presented in Table 3.

TABLE 3

Aging Test

| | | Polish/Formula | | | |
| --- | --- | --- | --- | --- | --- |
| Property | Control | E | F | H | I |
| Water Beading | 3.0 | 4.0 | 3.1 | 3.6 | 3.5 |
| Gloss | 3.0 | 3.1 | 3.1 | 3.0 | 3.0 |
| Image | 3.0 | 3.0 | 3.0 | 3.0 | 3.0 |

Polish Identification:
Control and E–H as described above in Example 4.
I — "Color Magic," Turtle Wax, Inc., Chicago, IL.

As summarized in Table 3, Formulae exhibited improved aging performance relative to the control and commercially available polishes.

Example 6

This example illustrates the formulation of a siloxane polymer composition of the present invention, Formula J, which contains a corrosion inhibitor and is effective as a general purpose lubricant (e.g., this composition provides excellent lubrication on door hinges and plastic parts).

Specifically, a composition comprising the following ingredients was prepared:

| Formula J | Volume Percent |
| --- | --- |
| Low viscosity siloxane polymer: | 6.0 |
| (Dow Corning 200 350 cSt) | |
| Surface bonding enhancer: | 2.0 |
| Diester fluid | |
| (Vistone A-30, Exxon | |
| Chemical Co., Houston, TX) | |
| Lower alkyl alcohol: | 54.0 |
| Isopropanol | |
| (Shell Oil Co., Houston, Tx) | |
| Citrus extract: | 30.0 |
| d-limonene | |
| (Florida Chemical Co., Lake Alfred, FL) | |
| Corrosion inhibitor: | 8.0 |
| Oil soluble petrolatum based | |
| (Mazon 202-108, PPG Mazer Chemicals, | |
| Gurnee, IL) | |

Formula J was tested for its ability to inhibit corrosion by first coating a mild steel test coupon with lubricant. After the lubricant dried, the lubricated steel coupon was placed in a container containing tap water sufficient to cover the coupon. The container was sealed and stored at room temperature. The coupon was then monitored for the commencement of corrosion (i.e., rust formation). Table 4 summarizes the results of the corrosion test for Formula J compared to a test control, WD-40 (WD-40 Company, San Diego, Calif.).

TABLE 4

Corrosion Test

| Lubricant | Time To Initial Corrosion |
| --- | --- |
| Control (no lubricant) | 8 hours |
| WD-40 | 300 hours |
| Formula J | 305 hours |

Example 7

This example illustrates the formulation of a siloxane polymer composition of the present invention, Formula K, which contains a corrosion inhibitor and an anti-wearing agent, and is effective as an EP chain lubricant. This formulation was tested for corrosion inhibition, penetration, and anti-wear properties. A composition comprising the following ingredients was prepared:

| Formula K | Volume Percent |
| --- | --- |
| Low viscosity siloxane polymer: | 6.0 |
| (Dow Corning 200 350 cSt) | |
| Surface bonding enhancer: | 2.0 |
| Diester fluid | |
| (Vistone A-30, Exxon | |
| Chemical Co., Houston, TX) | |
| Lower alkyl alcohol: | 46.0 |
| Isopropanol | |
| (Shell Oil Co., Houston, Tx) | |
| Citrus extract: | 30.0 |
| d-limonene | |
| (Florida Chemical Co., Lake Alfred, FL) | |
| Corrosion inhibitor: | 8.0 |
| Oil soluble petrolatum based | |
| (Mazon 202-108, | |

-continued

| Formula K | Volume Percent |
| --- | --- |
| PPG Mazer Chemicals, Gurnee, IL) | |
| Anti-wearing agent: | 8.0 |
| Sulfur type EP agent | |
| (Amoco 158, Ethyl Corporation, | |
| St. Louis, MO) | |

Formula K was tested for its corrosion inhibiting properties according to the corrosion test described above in Example 6. The corrosion test results for Formula K and other commercial lubricants are presented below in Table 5.

TABLE 5

Corrosion Test

| Lubricant | Time To Initial Corrosion |
| --- | --- |
| Control (no lubricant) | 8 hours |
| WD-40 | 300 hours |
| Bardahl Foamy Chain Lube | 280 hours |
| PJ 1 Chain Lube | 290 hours |
| (PJI Corporation, Scottsdale, AZ) | |
| Formula K | 305 hours |

Formula K was tested for its penetration properties. In the penetration test, identical length strips of Whatman filter paper (Number 40) were dipped into lubricant samples. Penetration was determined by measuring the time required for each lubricant to migrate to the top of the strip (i.e., migration time). The migration time reflects the ability of the lubricant to penetrate and disperse upon a wear surface. The penetration test results for Formula K and other commercial lubricants are presented below in Table 6.

TABLE 6

Penetration Test

| Lubricant | Migration Time |
| --- | --- |
| Control (light lubricant oil) | 330 minutes |
| WD-40 | 110 minutes |
| Bardahl BCS 362 | 95 minutes |
| Bardahl Super Spray | 125 minutes |
| Bardahl Foamy Chain Lube | 540 minutes |
| Formula K | 65 minutes |
| Formula J | 60 minutes |

Formula K was then tested for its anti-wear properties by a modified Timken Test, also known as Falex Lubricity Tester. In this test, a load was applied via a weighted level arm and the force required to obtain seizure between a stationary and rotating bearing was determined. The greater the weight required to induce seizure, the greater the anti-wear performance of the lubricant. The anti-wear test results for Formula K and other commercial lubricants are presented below in Table 7.

TABLE 7

Anti-Wear Test

| Lubricant | Inch Pounds @ Seizure |
| --- | --- |
| Control (no test lubricant) | 150 lbs. |
| WD-40 | 175 lbs. |
| Formula K | 400 lbs. |

These results indicate that Formula K provides superior extreme pressure/anti-wear performance.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

We claim:

1. A composition, comprising:
   a low viscosity siloxane polymer in an amount ranging from 1% to 40% by volume;
   a surface bonding enhancer in an amount ranging from 0.1% to 15% by volume;
   a lower alkyl alcohol in an amount ranging from 5% to 80% by volume; and
   a citrus extract in an amount ranging from 20% to 50% by volume, wherein the citrus extract comprises d-limonene.

2. The composition of claim 1 wherein the low viscosity siloxane polymer has a viscosity ranging from 50 to 1000 centistokes.

3. The composition of claim 1 wherein the low viscosity siloxane polymer is a trimethylsiloxy terminated polydimethylsiloxane.

4. The composition of claim 1 wherein the surface bonding enhancer is a diester fluid.

5. The composition of claim 4 wherein the diester fluid is derived from a dicarboxylic acid selected from the group consisting of phthalic acid, adipic acid, azelaic acid, and sebacic acid.

6. The composition of claim 1 wherein the diester fluid is a 30 centistoke diester fluid.

7. The composition of claim 1 wherein the surface bonding enhancer is a hydrophilic siloxane polymer.

8. The composition of claim 1 wherein the surface bonding enhancer is an amine functional silicone fluid.

9. The composition of claim 1 wherein the lower alkyl alcohol is selected from the group consisting of ethanol, isopropanol, and mixtures thereof.

10. The composition of claim 1, further comprising a high viscosity siloxane polymer, wherein the high viscosity siloxane polymer is present in the composition in an amount ranging from 0.1% to 40% by volume of the total composition.

11. The composition of claim 1 wherein the high viscosity siloxane polymer has a viscosity ranging from 5,000 to 2,500,000 centistokes.

12. The composition of claim 10 wherein the high viscosity siloxane polymer is a trimethoxysiloxy terminated polydimethylsiloxane.

13. The composition of claim 1, further comprising a corrosion inhibitor, wherein the corrosion inhibitor is present in the composition in an amount ranging from 3% to 20% by volume of the total composition.

14. The composition of claim 13 wherein the corrosion inhibitor is selected from the group consisting of oil soluble and oil/water soluble corrosion inhibitors.

15. The composition of claim 13 wherein the corrosion inhibitor is a petrolatum based corrosion inhibitor.

16. The composition of claim 13 wherein the corrosion inhibitor is a waxy corrosion inhibitor.

17. The composition of claim 13 wherein the corrosion inhibitor is a metal sulfonate.

18. The composition of claim 13, further comprising an anti-wearing agent, wherein the anti-wearing agent is present in the composition in an amount ranging from 4% to 20% by volume of the total composition.

19. The composition of claim 18 wherein the anti-wearing agent is selected from the group consisting of sulfur-type and sulfur-phosphorous type anti-wearing agents.

20. The composition of claim 18 wherein the anti-wearing agent is a dimercaptothiadiazole derivative.

21. The composition of claim 18 wherein the anti-wearing agent is selected from a sulfur-type extreme pressure anti-wearing agent.

22. A method of cleaning, polishing or lubricating a surface comprising applying to the surface a composition comprising:

a low viscosity siloxane polymer in an amount ranging from 1% to 40% by volume;

a surface bonding enhancer in an amount ranging from 0.1% to 15% by volume;

a lower alkyl alcohol in an amount ranging from 5% to 80% by volume; and a citrus extract in an amount ranging from 20% to 50% by volume, wherein the citrus extract comprises d-limonene.

23. The method of claim 22 wherein the composition further comprises a high viscosity polymer, wherein the high viscosity siloxane polymer is present in the composition in an amount ranging from 0.1% to 40% by volume of the total composition.

24. The method of claim 22 wherein the composition further comprises a corrosion inhibitor, wherein the corrosion inhibitor is present in the composition in an amount ranging from 3% to 20% by volume of the total composition.

25. The method of claim 24 wherein the composition further comprises an anti-wearing agent, wherein the anti-wearing agent is present in the composition in an amount ranging from 4% to 20% by volume of the total composition.

* * * * *

UNITED STATES PATENT AND TRADEMARK OFFICE
CERTIFICATE OF CORRECTION

PATENT NO. : 5,470,504
DATED : November 28, 1995
INVENTOR(S) : Arthur J. Kiehn, et al.

It is certified that error appears in the above-indentified patent and that said Letters Patent is hereby corrected as shown below:

In column 12, claim 11, line 46, following "claim", please delete "1" and insert therefor --10--.

Signed and Sealed this

Twenty-first Day of May, 1996

Attest:

BRUCE LEHMAN

Attesting Officer     Commissioner of Patents and Trademarks